United States Patent Office 3,133,116
Patented May 12, 1964

3,133,116
ACYLATED 3-AMINO - 5 - HYDROXY - 2,4,6 - TRI-
IODOBENZOIC ACID AND ESTERS AND SALTS
THEREOF
Aubrey A. Larsen, Schodack, N.Y., assignor to Sterling
Drug Inc., New York, N.Y., a corporation of Delaware
No Drawing. Filed Nov. 26, 1958, Ser. No. 776,411
4 Claims. (Cl. 260—479)

This invention relates to acylated 3-amino-5-hydroxy-2,4,6-triiodobenzoic acids and esters and salts thereof. It also relates to methods for the preparation of said acids and to intermediates in said preparation.

The compounds of the invention have the general formula:

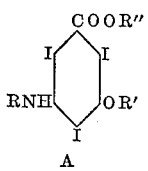

A wherein R and R′ represent the same or different lower-alkanoyl radicals, and R″ represents hydrogen or a lower-alkyl radical.

In the above general Formula A, the lower-alkanoyl radicals R and R′ are acyl radicals derived from a straight or branched chain lower-fatty acid having from one to about six carbon atoms, and thus can include any of such groups as formyl, acetyl, propionyl, butyryl, isobutyryl, valeryl, caproyl, isocaproyl, and the like.

When the group R″ in the above general Formula A represents a lower-alkyl radical, it stands for an alkyl radical having from one to about six carbon atoms and thus includes such radicals as methyl, ethyl, propyl, isopropyl, butyl, isobutyl, amyl, hexyl, and the like.

The compounds of the above Formula A are useful as X-ray contrast agents and the compounds wherein R″ is hydrogen are particularly valuable in the form of their pharmacologically acceptable, water-soluble salts as intravenous urographic agents for excretory urography or retrograde pyelography, or as intravenous cholecystographic agents. The members of lower molecular weight, i.e., where R and R′ taken together have from two to about six carbon atoms are urographic agents, whereas the members of higher molecular weight, i.e., where R and R′ taken together have more than about six carbon atoms are cholecystographic agents. The compounds have a very low intravenous toxicity, the lethal dose being of the order of several thousand milligrams per kilogram of mammalian body weight.

The esters of Formula A wherein R″ is lower-alkyl are also useful as X-ray contrast agents, in particular for myelography, bronchography or hepatolienography.

The compounds of Formula A wherein R and R′ represent identical lower-alkanoyl radicals are prepared by direct acylation of 3-amino-5-hydroxy-2,4,6-triiodobenzoic acid or a lower-alkyl ester thereof. The acylation is carried out by heating the amino compound with at least two molar equivalents of a lower-alkanoic acid anhydride or halide, either in the presence or absence of an inert solvent. The acylation reaction may be catalyzed by the addition of a small amount of a strong acid such as sulfuric acid or perchloric acid. The reaction takes place over a wide variety of temperature conditions, preferably between about 50° C. and 150° C. In the event that compounds wherein R and R′ are formyl radicals are desired, the formylation is carried out by heating the iodinated acid or ester with a mixture of formic acid and acetic anhydride.

The intermediate 3-amino-5-hydroxy-2,4,6-triiodobenzoic acid is itself a new compound and can be prepared from the known 3-nitro-5-hydroxybenzoic acid by catalytically hydrogenating the nitro group followed by iodinating the resulting 3-amino-5-hydroxybenzoic acid, for example, by reacting it with at least about three molar equivalents of iodine monochloride in acid medium. If esters wherein R″ of Formula A is a lower-alkyl radical are desired, an esterification step is included, preferably at an early stage of the synthesis, as by heating the benzoic acid derivative with a lower-alkanol in the presence of a strong acid such as sulfuric acid.

The compounds of Formula A wherein R and R′ represent different lower-alkanoyl radicals can be prepared by the following reaction scheme:

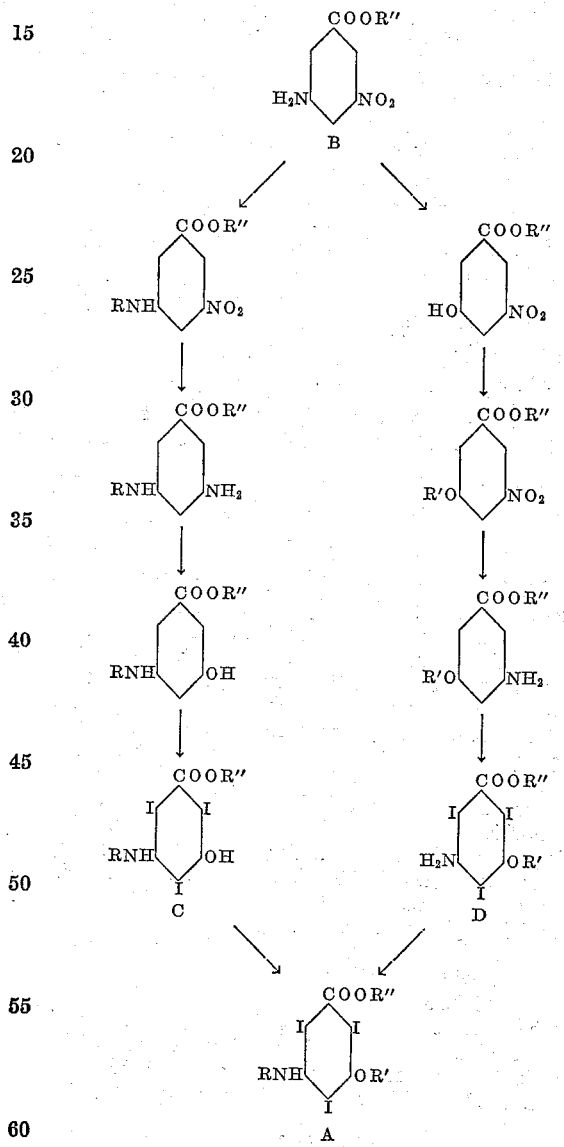

There are two alternative routes to compounds of formula A starting from the known 3-amino-5-nitrobenzoic acid (B, R″=H). The first route comprises acylating the latter with the moiety R to give a 3-acylamino-5-nitrobenzoic acid, then reducing the nitro group to an amino group to yield a 3-acylamino-5-aminobenzoic acid, then replacing the amino group by a hydroxy group by means of diazotization and acid hydrolysis to produce a 3-acylamino-5-hydroxybenzoic acid, iodinating the latter to give a 3-acylamino-5-hydroxy-2,4,6-triiodobenzoic acid (C,R″=H), and finally esterifying the hydroxy group with any desired acyl moiety R′.

The second route comprises replacing the amino group of 3-amino-5-nitrobenzoic acid (B, R″=H) by a hydroxyl group by means of diazotization and acid hydrolysis, esterifying the resulting 3-hydroxy-5-nitrobenzoic acid with the moiety R′ to give a 3-acyloxy-5-nitrobenzoic acid, reducing the nitro group to an amino group, iodinating the resulting 3-acyloxy-5-aminobenzoic acid to give a 3-amino-5-acyloxy-2,4,6-triiodobenzoic acid (D, R″=H), and finally acylating the amino group with any desired acyl moiety R.

Again, if compounds wherein R″ is lower-alkyl are desired, they are produced by conventional esterification procedures at any stage of the synthesis, preferably prior to the iodination step.

For intravenous administration the compounds of Formula A (R″=H) are used in the form of pharmacologically acceptable, water-soluble salts derived from neutralization of the acids with inorganic or organic bases such as alkali metal hydroxides, ammonium hydroxide, alkyl amines, alkanol amines and the like, and these salts are within the purview of the invention. The sodium salt is preferred, although the diethylamine, diethanolamine and N-methylglucamine salts can also be used with advantage.

Salts of acids of Formula A (R″=H) which are water-insoluble and/or pharmacologically unacceptable because of high toxicity or the like in the cation are, however, also within the purview of the invention because they are useful as intermediates in the purification of and in the characterization of the free acids. Such salts are readily convertible to the free acid by addition of a strong mineral acid, or to a pharmacologically useful salt by ion exchange reactions.

The structures of the compounds disclosed herein were established by the mode of their synthesis and by the fact that the values found upon elementary analysis corresponded with the values calculated for the assigned structures.

The following examples will further illustrate the invention without the latter being limited thereby.

*Example 1*

3-amino-5-hydroxy-2,4,6-triiodobenzoic acid: To a suspension of 18 g. of 3-nitro-5-hydroxybenzoic acid in 200 ml. of water to which 8.32 ml. of 12 N hydrochloric acid has been added, there was added about 0.5 g. of platinum oxide catalyst, and the mixture was hydrogenated with gaseous hydrogen at a pressure of 50 lbs. per sq. in. After the amount of hydrogen required to reduce the nitro group to an amino group had been taken up, the reaction mixture was filtered to remove the catalyst and the filtrate poured into a solution of 16.4 ml. of iodine monochloride in 100 ml. of 6 N hydrochloric acid. The resulting mixture was stirred for fifteen minutes and diluted to a volume of 800 ml. with water. The solid product was collected by filtration, washed with water and air dried, giving 43 g. of 3-amino-5-hydroxy-2,4,6-triiodobenzoic acid, used in the acylation reaction below in Example 2 without further purification.

A sample of the 3-amino-5-hydroxy-2,4,6-triiodobenzoic acid, when recrystallized from aqueous methanol and then dissolved in dilute ammonium hydroxide, decolorized with activated charcoal, filtered and acidified, had the M.P. 182–183° C. with decomposition starting at 150° C.

*Example 2*

3-acetamido-5-acetoxy-2,4,6-triiodobenzoic acid (A; R is CH$_3$CO, R′ is COCH$_3$, R″ is H): A mixture of 33 g. of 3-amino-5-hydroxy-2,4,6-triiodobenzoic acid and 20 ml. of acetic anhydride was heated on a hot plate until a clear solution was produced. Two drops of concentrated sulfuric acid was then added and the solution was boiled for a few minutes. The reaction mixture was chilled, and the solid product was collected by filtration, washed with petroleum ether (Skellysolve B) and dried to give 32 g. of 3-acetamido-5-acetoxy-2,4,6-triiodobenzoic acid, M.P. 257–259° C. (uncorr.). A sample of the compound when recrystallized from ethanol and dried at 100° C. had the M.P. 257.2° C. (decompn.) (corr.).

*Analysis.*—Calcd. for C$_{11}$H$_8$I$_3$NO$_5$: C, 21.5; I, 62.0. Found: C, 22.1; I, 62.0.

A neutralization equivalent determination (found, 583) indicated that the phenolic hydroxy group had been esterified.

3-acetamido-5-acetoxy-2,4,6-triiodobenzoic acid in the form of an aqueous solution of its sodium salt was found to have an intravenous toxicity in mice (ALD$_{50}$) of 3750 mg./kg., and when injected intravenously in mammals it causes visualization of the kidneys and urinary tracts.

*Example 3*

3-acetamido-5-acetoxy-2,4,6-triiodobenzoic acid reacts with a molar equivalent amount of sodium hydroxide, potassium hydroxide, ammonium hydroxide, diethanolamine or N-methylglucamine to give the highly water-soluble sodium, potassium, ammonium, diethanolamine or N-methylglucamine salts, respectively.

3-acetamido-5-acetoxy-2,4,6-triiodobenzoic acid reacts with lead nitrate solution to give the water-insoluble lead salt. The latter is purified by leaching with an organic solvent such as acetone, and then can be converted back to the free acid by treating it with an excess of hydrochloric acid followed by repeated washing with hot water to remove lead chloride. Residual traces of lead can be removed by recrystallizing the acid from methanol.

*Example 4*

3-formamido-5-formyloxy-2,4,6-triiodobenzoic acid (A; R is HCO, R′ is COH, R″ is H) can be prepared by heating 3-amino-5-hydroxy-2,4,6-triiodobenzoic acid and an excess of formic acid and acetic anhydride according to the manipulative procedure described above in Example 2.

*Example 5*

3 - propionamido - 5-propionyloxy-2,4,6-triiodobenzoic acid (A; R is CH$_3$CH$_2$CO, R′ is COCH$_2$CH$_3$, R″ is H) can be prepared by heating 3-amino-5-hydroxy-2,4,6-triiodobenzoic acid and an excess of propionic anhydride according to the manipulative procedure described above in Example 2.

*Example 6*

3 - butyramido - 5-butyryloxy-2,4,6-triiodobenzoic acid (A, R is CH$_3$(CH$_2$)$_2$CO, R′ is CO(CH$_2$)$_2$CH$_3$, R″ is H) can be prepared by heating 3-amino-5-hydroxy-2,4,6-triiodobenzoic acid and an excess of butyric anhydride according to the manipulative procedure described above in Example 2.

*Example 7*

3 - valeramido - 5 valeryloxy-2,4,6-triiodobenzoic acid (A; R is CH$_3$(CH$_2$)$_2$CO, R′ is CO(CH$_2$)$_2$CH$_3$, R″ is H) can be prepared by heating 3-amino-5-hydroxy-2,4,6-triiodobenzoic acid and an excess of valeric anhydride according to the manipulative procedure described above in Example 2.

*Example 8*

3 - isobutyramido - 5-isobutyryloxy-2,4,6-triiodobenzoic acid (A; R is (CH$_3$)$_2$CHCO, R′ is COCH(CH$_3$)$_2$, R″ is H) can be prepared by heating 3-amino-5-hydroxy-2,4,6-triiodobenzoic acid and an excess of isobutyric anhydride according to the manipulative procedure described above in Example 2.

*Example 9*

3 - caproamido - 5-caproyloxy-2,4,6-triiodobenzoic acid (A, R is CH$_3$(CH$_2$)$_4$CO, R′ is CO(CH$_2$)$_4$CH$_3$, R″ is H) can be prepared by heating 3-amino-5-hydroxy-2,4,6-triiodobenzoic acid and an excess of caproic anhydride according to the manipulative procedure described above in Example 2.

Example 10

3-amino-5-nitrobenzoic acid heated with an excess of acetic anhydride in the presence of a few drops of perchloric acid yields 3-acetamido-5-nitrobenzoic acid.

3-acetamido-5-nitrobenzoic acid suspended in dilute hydrochloric acid is hydrogenated in the presence of platinum oxide catalyst to give 3-acetamido-5-aminobenzoic acid.

3-acetamido-5-aminobenzoic acid is converted to its sulfate salt by adding an excess of dilute sulfuric acid, and the sulfate salt is treated with aqueous sodium nitrite at 0° C. to form the diazonium sulfate. The diazonium sulfate is added gradually to hot, dilute sulfuric acid, the mixture filtered and added to ice water, whereupon there precipitates 3-acetamido-5-hydroxybenzoic acid.

A neutral aqueous solution of the ammonium salt of 3-acetamido-5-hydroxybenzoic acid when added to a slight excess of a dilute aqueous solution of potassium iododichloride ($KICl_2$) yields 3-acetamido-5-hydroxy-2,4,6-triiodobenzoic acid (C; R is $CH_3CO$, R″ is H).

3-acetamido-5-hydroxy-2,4,6-triiodobenzoic acid heated with an excess of propionic anhydride in the presence of sulfuric acid according to the manipulative procedure described above in Example 2 produces 3-acetamido-5-propionyloxy-2,4,6-triiodobenzoic acid (A; R is $CH_3CO$, R′ is $COCH_2CH_3$, R″ is H).

Example 11

3-nitro-5-hydroxybenzoic acid heated with an excess of acetic anhydride in the presence of a few drops of sulfuric acid yields 3-nitro-5-acetoxybenzoic acid.

3-nitro-5-acetoxybenzoic acid suspended in dilute hydrochloric acid is hydrogenated in the presence of platinum oxide catalyst to give 3-amino-5-acetoxybenzoic acid hydrochloride.

3-amino-5-acetoxybenzoic acid hydrochloride stirred with a slight excess of a dilute aqueous solution of potassium iododichloride ($KICl_2$) yields 3-amino-5-acetoxy-2,4,6-triiodobenzoic acid (D; R′ is $OCCH_3$, R″ is H).

3-amino-5-acetoxy-2,4,6-triiodobenzoic acid heated with an excess of butyric anhydride in the presence of sulfuric acid according to the manipulative procedure described above in Example 2 produces 3-butyramido-5-acetoxy-2,4,6-triiodobenzoic acid (A; R is $CH_3CH_2CH_2CO$, R′ is $COCH_3$, R″ is H).

Example 12

3-nitro-5-hydroxybenzoic acid heated with ethanol in the presence of sulfuric acid yields ethyl 3-nitro-5-hydroxybenzoate.

Ethyl 3-nitro-5-hydroxybenzoate suspended in dilute hydrochloric acid is hydrogenated in the presence of platinum oxide catalyst to give ethyl 3-amino-5-hydroxybenzoate.

Ethyl 3-amino-5-hydroxybenzoate stirred with an excess of iodine monochloride in 6 N hydrochloric acid according to the manipulative procedure described above in Example 1 yields ethyl 3-amino-5-hydroxy-2,4,6-triiodobenzoate.

Ethyl 3-amino-5-hydroxy-2,4,6-triiodobenzoate heated with an excess of acetic anhydride in the presence of sulfuric acid according to the manipulative procedure described above in Example 2 produces ethyl 3-acetamido-5-acetoxy-2,4,6-triiodobenzoate (A; R is $CH_3CO$, R′ is $COCH_3$, R″ is $C_2H_5$).

By completely analogous procedures there can be prepared the corresponding methyl (R″ is $CH_3$), propyl (R″ is $CH_2CH_2CH_3$), isopropyl (R″ is $CH(CH_3)_2$), butyl (R″ is $(CH_2)_3CH_3$) and hexyl (R″ is $(CH_2)_5CH_3$) esters.

The foregoing esters are particularly useful for visualizing the bronchial tree. They can be introduced into the lungs of mammals by conventional means either as a finely divided dust or in an aqueous suspension prepared by the aid of emulsifying agents or thickening agents. Such suspending aids include carboxymethylcellulose, polyethylene glycol, polyethylene glycol esters, polyoxyalkylene ethers of partial higher fatty acid esters of polyhydroxy alcohol type non-ionic surface active agents, and the like.

I claim:
1. A compound having the formula

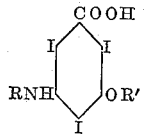

wherein R and R′ are lower-alkanoyl.

2. A pharmaceutically acceptable, water-soluble salt of a compound having the formula

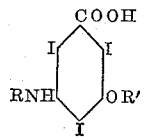

wherein R and R′ are lower-alkanoyl.

3. 3-acetamido-5-acetoxy-2,4,6-triiodobenzoic acid.

4. A pharmaceutically acceptable, water-soluble salt of 3-acetamido-5-acetoxy-2,4,6-triiodobenzoic acid.

References Cited in the file of this patent

UNITED STATES PATENTS

| | | |
|---|---|---|
| 2,611,786 | Wallingford | Sept. 23, 1952 |
| 2,681,363 | Schwenk et al. | June 15, 1954 |
| 2,939,881 | Wiegert | June 7, 1960 |

FOREIGN PATENTS

| | | |
|---|---|---|
| 517,382 | Great Britain | Jan. 29, 1940 |
| 748,319 | Great Britain | Apr. 25, 1956 |

OTHER REFERENCES

Larsen et al.: J.A.C.S., vol. 78, pages 3210–6 (1956).

UNITED STATES PATENT OFFICE
CERTIFICATE OF CORRECTION

Patent No. 3,133,116

May 12, 1964

Aubrey A. Larsen

It is hereby certified that error appears in the above numbered patent requiring correction and that the said Letters Patent should read as corrected below.

Column 4, line 55, for "(A; R is $CH_3(CH_2)_2CO$, R' is $CO(CH_2)_2CH_3$, R" is H)" read -- (A; R is $CH_3(CH_2)_3CO$, R' is $CO(CH_2)_3CH_3$, R" is H) --.

Signed and sealed this 22nd day of September 1964.

(SEAL)
Attest:

ERNEST W. SWIDER
Attesting Officer

EDWARD J. BRENNER
Commissioner of Patents